Oct. 9, 1962  L. M. SIMPKINS  3,058,030
HEADLIGHT CONTROL
Filed Feb. 8, 1962

INVENTOR.
LYLE M. SIMPKINS
BY Kimmel & Crowell
ATTORNEYS.

United States Patent Office 3,058,030
Patented Oct. 9, 1962

3,058,030
HEADLIGHT CONTROL
Lyle M. Simpkins, 5401 2nd Ave., Sacramento, Calif.
Filed Feb. 8, 1962, Ser. No. 171,951
6 Claims. (Cl. 315—82)

This invention relates to a headlight control and has particular applicability to the headlights of a motor vehicle.

A primary object of this invention is the provision of a device in association with the headlights of a motor vehicle which will automatically, after a predetermined period, turn the lights off in the event that they are accidentally turned on or left on unintentionally when the engine is not running.

A further object of the invention is the provision of means which, in the event of accidental engine failure, will retain the headlights in illuminated condition for at least sufficient length of time to permit bringing the vehicle to a full stop, and then extinguish the headlights automatically.

An additional object of the invention resides in the provision of circuitry which includes a vacuum actuated switch controlled by a vacuum from the intake manifold of the vehicle, and an electric motor provided with a pair of cams which selectively energize and de-energize switches in order that the lights may be automatically turned off when the engine is not running.

A further object of the invention is the provision of a device of this character which may be readily controlled by the operator of the vehicle with a minimum of effort and difficulty, and which may be cut in or out as desired, as for example, in the event of failure of any of the components of the control system.

Still another object resides in the provision of a device of this character which is reliable and efficient in operation, simple and inexpensive to install, and completely automatic in operation.

Still other objects reside in the combination of elements, arrangements of parts, and features of constructions, all as will be more fully pointed out hereinafter, and disclosed in the accompanying drawing wherein there is shown a preferred embodiment of this inventive concept.

In the drawing.

Similar reference characters refer to similar parts throughout the several views of the drawing.

Figure 1:
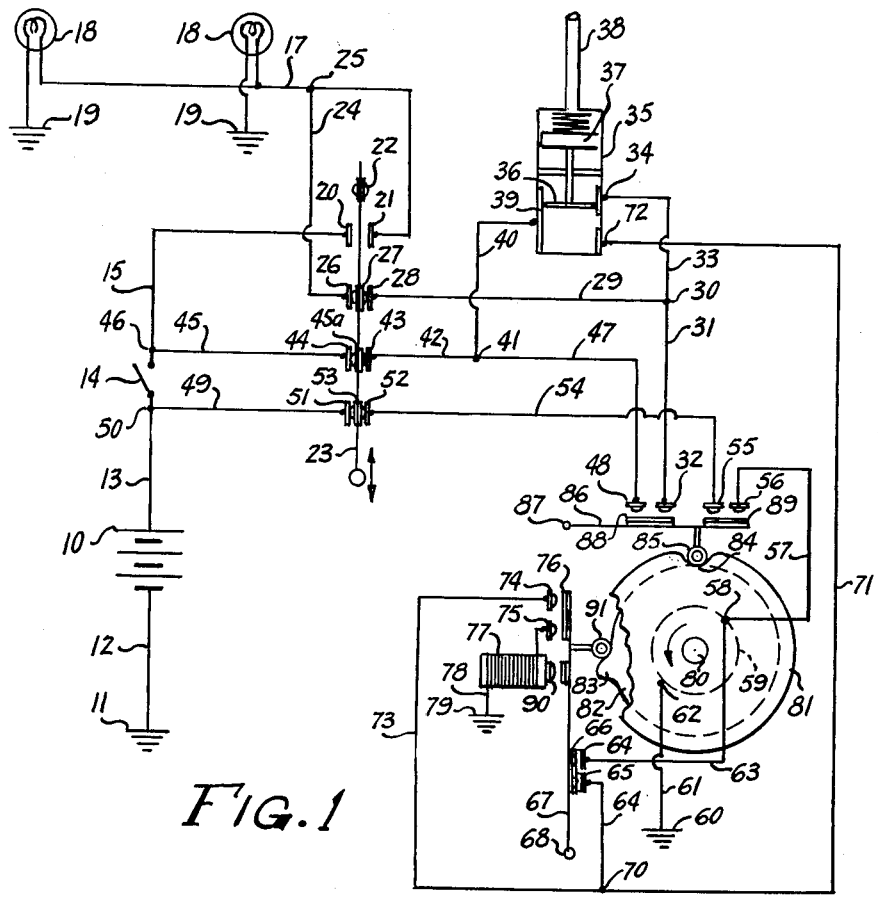
FIGURE 1 is a schematic wiring diagram showing the association of the control device of the instant invention with the headlights of the motor vehicle and with the headlight switch connected to the battery of the vehicle.
Figure 2:
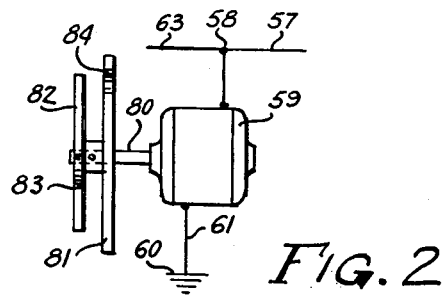
FIGURE 2 is a fragmentary side elevational view, partially schematic, showing an electric motor and a pair of cam wheels employed in conjunction with the instant invention.

Having reference now to the drawings in detail, there is shown at 10 a conventional motor vehicle battery which is grounded as at 11 through a wire 12. A wire 13 extends from the battery to a headlight switch 14, from which a wire 15 extends to a headlight line 17 for the illumination of headlights 18, the latter being suitably grounded as at 19 to close the circuit to the battery, manually when desired. It is noted that the wire 15 extends to a contact 20, provided with an opposite contact 21, and a contact closing switch member 22, which, when the device of the instant invention is in operation, cuts out the circuit entirely so that the headlights may be controlled directly by the switch 14. The contact 22 comprises a part of a manual switch 23 which is preferably located at a desirable position adjacent the driver, either on the dash or under the same, or on the steering post, or in any other convenient and readily accessible position.

With the switch 23 in the position shown, direct communication from the battery to the headlights is precluded by the position of contact 22. However, contact and the closure of a circuit to the lights 18 is effected by closure of the conventional headlight switch 14 through the apparatus of the instant invention, which will be hereinafter described.

A line 24 extends from a terminal 25 in line 17 to a contact 26 which is closed by a switch member 27 to bridge a circuit with a contact 28 to permit current to flow through a wire 29 to a terminal 30, and thence through a wire 31 to the contact 32 of a normally open switch to be more fully described hereinafter. A wire 33 extends from terminal 30 to one contact 34 of a vacuum actuated switch 35 having a contact bridging member 36 therein, switch 35 being controlled by a piston 37, which is in turn actuated by a line 38 which creates a vacuum in the switch from the intake manifold of the motor when the motor is running. With contact bridging member 36 in the position shown, or when the engine is running, a circuit is established between contact 34 and an opposite contact 39 from which a wire 40 leads to a terminal 41 and a wire 42. Wire 42 extends to a switch contact 43 which is opposite a switch contact 44 from which a wire 45 extends to a terminal 46 in the wire 15. Contacts 43 and 44 are adapted to be closed by a switch member 45a, which is closed when contacts 26 and 28 are bridged by switch member 27, or when direct manual control of the headlights is rendered ineffectual with the switch 23 in the position as shown.

From terminal 41 a second wire 47 extends to a second contact 48 adjacent the contact 32.

A wire 49 extends from the terminal 50 in line 13 between the battery 10 and the switch 14, so that current directly from the battery may flow through wire 49 to a contact 51 which is opposite a contact 52 and which is closed by a switch member 53 when switch 23 is in the automatic operating position disclosed.

From contact 52 a wire 54 extends to a contact point 55.

A contact 56, aligned with contact 55 and adapted to be simultaneously closed, is connected by a wire 57 to the terminal 58 of an electric motor 59, which is grounded at 60 through a wire 61 extending from the other terminal 62 of the motor.

A second wire 63 leads from terminal 58 to a switch contact 64, which is normally in electrical association with the contact 65 through a movable contact 66 which is mounted on a pivoted switch arm 67 pivoted as at 68. From the contact 65 a wire 69 extends to a terminal 70.

From terminal 70 a wire 71 extends to a contact 72 in vacuum switch 35 and which is adapted to be closed by switch element 36 to complete a circuit to contact 39 for a purpose to be more fully described hereinafter.

A second wire 73 extends from terminal 70 to a contact 74, which is adapted under circumstances to be described hereinafter, to close a circuit where the contact 75 through a contact member 76 carried by the switch arm 67. Contact 75 engages one end of a solenoid coil 77, from the other end of which a wire 78 extends to ground 79.

The motor 59 is provided with a drive shaft 80, which rotates a pair of discs 81 and 82 spaced apart by means of a bushing 83, it being understood that any suitable speed reduction mechanism may be provided in or associated with the drive shaft 80 to reduce the speed of rotation of discs 81 and 82 as may be desired. Disc 81 is provided with a notch or indentation 84 which engages a roller 85 carried by a switch arm 86 which is pivoted as at 87 and includes a pair of contact bridging members 88 and 89.

Disc 82 is of lesser diameter than disc 81 and is provided with a projection 90 which engages a follower 91 carried by the pivoted switch arm 67, and which, when engaged with the follower 91, will cause contacts 74 and 75 to be bridged by contact member 76, and which will at the same time break the circuit between contacts 64 and 65. Correspondingly, when the switch arm 86 is in the position as shown, the circuit between contact 32 and contact 48 will be open, as will the circuit between contacts 55 and 56, these contacts being normally bridged by means of the contact members 88 and 89, respectively, carried by the arm 86.

It is to be noted that while the component parts of this invention including the manual switch 23 of the motor 59 and its associated discs 81 and 82, and the vacuum switch assembly 35 may be positioned in any convenient location on the motor vehicle, that switch 23 is as previously mentioned, positioned so as to be immediately available to the driver of the vehicle when desired. Vacuum actuated switch 35 is similarly located on or near the intake manifold to the vehicle, and the motor 59 and its associated mechanism are mounted in the engine compartment, as, for example, on the fire wall of the vehicle.

In the use and operation of the device as previously described, when switch contact 22 bridges contacts 20 and 21, lights 18 are manually illuminated by closure of light switch 14, which is conventional.

However, with the switch 23 in the position shown, when switch 14 is closed, a circuit to lights 18 is established through wire 24 and contacts 26 and 28 through switch part 27, wire 29, wire 33, contact 34 and switch member 36 through contact 39 and wire 40, back through wire 42 to terminal 46, switch 14, and battery 10. Thus the lights operate effectively as long as the motor is in operation, and without any complexities or difficulties.

However, when the engine stalls or stops for any reason, or when the lights are left on after turning off the ignition, vacuum operated switch 36 moves to a position to bridge contacts 72 and 39. With the light switch closed a circuit is then established from battery 10 through wire 13, switch 14, wires 45 and 42, contacts 43 and 44 being bridged by a switch member 45, wire 40, contact 39, switch element 36, contact 72, wire 71, wire 69, contact 65 and switch member 66, contact 64 and wire 63, to motor terminal 58 to energize the motor. Such energization of the motor will cause the cam follower 85 to ride out of the depression 84 closing the switch arm 86. Such closure will bridge contacts 55 and 56 so that a circuit is maintained to the motor through line 49 directly from the line 13 through the battery 10, contact members 51 and 52 through switch member 53, wire 54, contact 55, switch member 89, and contact 56 through wire 57 to terminal 58 causing continued operation of the motor until one revolution of cam disc 81 has been completed and cam follower 85 drops into depression 84, even if light switch is opened. Just before discs 81 and 82 complete one revolution the projection 90 on disc 82 will cause closure of the switch arm 67 which will open contacts 65 and 64 to discontinue current through terminal 58 to motor 59 from this source. The closure of contacts 74 and 75 will automatically energize relay coil 77 through wires 73 and 71, contact 72, vacuum switch member 36, contact 39, wires 40, 42, and 45, contacts 43 and 44 being bridged by switch member 45 and, through switch 14, back to battery 10. Relay coil 77 will hold switch member 66 away from points 64 and 65 so that motor 59 receives no current through wire 63 until light switch 14 is opened or until the engine is started, causing vacuum switch 35 to move switch part 36 away from contact point 72. When one or both of these two things happens, arm 67 will drop down closing circuit between points 64 and 65 so that motor 59 will again receive current through lines 71 and 69 if light switch 14 is closed or if engine stops when light switch 14 is closed.

The motor 59 will thus remain energized through contact 55, switch member 89, and contact 56 to continue to rotate discs 81 and 82, and the headlights will remain illuminated as long as switch arm 86 maintains contact member 88 in bridging relation with contacts 48 and 32 and switch member 89 with contacts 55 and 56. The headlights will similarly remain illuminated through wires 31 and 29, contacts 26 and 28 bridged by switch member 27 and wire 24 until such time as one complete revolution of disc 81 has been effected, at which time cam follower 85 will fall into the groove 84 breaking the circuit between contacts 48 and 32, and similarly between contacts 55 and 56. This will in turn, through the circuit previously described, break the contacts to lights 18, causing them to go out.

At this time the motor 59 will be de-energized. If the engine is restarted, the vacuum actuated switch member 36 will break the contact between contact members 39 and 72, re-establish contact between contact members 39 and 34, at which time the lights would receive current through wires 33, 29, 24, etc.

It will thus be seen that as long as the motor 59 is energized through the circuitry previously described, the headlights 18 will remain illuminated after engine failure for a length of time sufficient to permit the motor vehicle to be brought to a stop. It will also be seen that after a relatively short period of time, if the light switch is accidentally closed after the ignition is cut off, that the lights will automatically be cut off through the circuitry previously disclosed as soon as disc 81 completes one revolution allowing cam follower 85 to drop into depression 84 breaking contact between points 55 and 56 (causing current flow to motor 59 to cease) and points 32 and 48 causing lights to go out.

While in the illustrative embodiment of the invention herein shown, it is contemplated that the lights will remain illuminated through one complete rotation of discs 81 and 82, which rotation may be for any desired duration in accordance with the speed of the drive shaft 80, which, as previously pointed out, may be controlled by any suitable conventional reduction gearing or similar speed reduction mechanism it is to be understood that additional cam members 90 or depressions 84 may be spaced about the discs 81 and 82 at desired intervals.

It is to be noted that this automatic device is never in motion as a regular thing. If engine is started before light switch is closed and the light switch is opened before the engine is stopped, the device will not operate. If the light switch is closed without the engine running, the device will start and complete one revolution only. If the engine stops when light switch is closed, the device will start and make one revolution only. At the completion of one revolution, the device comes to complete rest, ready to start again if needed.

Similarly, it is within the contemplation of this inventive concept that means may be provided whereby more than one revolution of the discs 81 and 82 may be permitted before the lights 18 are extinguished.

From the foregoing it will now be seen that there is herein provided an improved headlight control which accomplishes all the objects of this invention, and others, including advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In an automatic headlight control, for a vehicle having an internal combustion engine, to extinguish the headlights a predetermined time after stoppage of the engine, a battery, a headlight switch connected thereto, a manual control multiple contact switch, having one pair of contacts which, when in closed position, establish a direct circuit to said headlights, a vacuum actuated switch adapted to be attached to the intake manifold of the engine, an electric motor, a pair of rotatable cam discs connected to said motor, a solenoid switch, a first circuit through said vacuum actuated switch, closed when the engine is actuated to said headlights, said manual control multiple contact switch having additional pairs of contacts which are normally closed when said one pair of contacts are open, said first circuit from said vacuum actuated switch extending through one of said normally closed pair of contacts, a second circuit through said vacuum actuated switch closed when said engine is stopped, extending to said electric motor to energize the same to rotate said cam discs, a first disc operated switch, rotation of one of said discs closing a holding circuit to said motor through said first disc operated switch, said holding circuit retaining said lights in illuminated condition, a second disc operated switch, rotation of the other of said discs closing a circuit through said second disc operated switch to said solenoid, said solenoid holding said second disc operated switch to break said second circuit to said motor through said vacuum actuated switch, said first disc having a low dwell portion, continued rotation of said first disc until said low dwell is adjacent said first disc operated switch opening the circuits through the latter to stop said motor, restarting of said engine breaking the circuit to said solenoid and said electric motor through said vacuum actuated switch and re-establishing said circuit to said headlights through said vacuum actuated switch.

2. In combination with a vehicle having an engine, an intake manifold, headlights, a battery and a headlight switch between said battery and said headlights, a first circuit directly to said headlights from said battery, a manual switch for breaking said first circuit, breaking of said first circuit by said manual switch closing a second current to said lights, a vacuum actuated switch in said second circuit and connected to said intake manifold and operable when said engine is running to illuminate said headlights, a third circuit through said vacuum actuated switch to illuminate said headlights when said engine is stopped, an electric motor in said third circuit, a rotatable cam disc operable by said electric motor to close a disc operated switch to close said third circuit to said headlights for a predetermined period and then break said third circuit to deenergize said headlights after a predetermined rotation of said disc and simultaneously to stop said electric motor on de-energization of said headlights.

3. The structure of claim 2 wherein the last-mentioned means includes a solenoid, a second cam disc operable by said electric motor to energize said solenoids, to close a second disc operated switch to retain a holding circuit through said solenoid, a fourth circuit through said solenoid to said vacuum actuated switch closed by stoppage of said engine, starting of said engine breaking the circuit to said solenoid to de-energize said solenoid and reclose said second disc operated switch, to close a circuit to said motor to render the same ready for re-energization upon closure of said vacuum actuated switch.

4. A headlight control for vehicles comprising a circuit including a two position switch and a battery, said switch, when in one position, energizing said circuit to said lights, a manual switch in said one circuit movable to a position to close said one circuit, a by-pass circuit extending from said battery, said manual switch when in another position opening said one circuit and closing said by-pass circuit, a vacuum operated switch connected to the intake manifold of the engine in said by-pass circuit maintaining said by-pass circuit closed when said engine is operating, a third circuit, closed by said vacuum operated switch when said engine is stopped, an electric motor actuated by said third circuit, and timed means operable by said motor for retaining said third circuit closed to illuminate said headlights for a predetermined period after stoppage of the engine.

5. A headlight control for vehicles comprising a circuit including a two position switch and a battery, said switch, when in one position, energizing said circuit to said lights, a manual switch in said one circuit movable to a position to close said one circuit, a by-pass circuit extending from said battery, said manual switch when in another position opening said one circuit and closing said by-pass circuit, a vacuum operated switch connected to the intake manifold of the engine in said by-pass circuit maintaining said by-pass circuit closed when said engine is operating, a third circuit, closed by said vacuum operated switch when said engine is stopped, an electric motor actuated by said third circuit, and timed means operable by said motor for retaining said third circuit closed to illuminate said headlights for a predetermined period after stoppage of the engine, said timed means including a cam disc rotatable by said electric motor and a cam actuated switch normally in closed position to close said third circuit until said cam disc opens said cam actuated switch.

6. A headlight control for vehicles comprising a circuit including a two position switch and a battery, said switch, when in one position, energizing said circuit to said lights, a manual switch in said one circuit movable to a position to close said one circuit, a by-pass circuit extending from said battery, said manual switch when in another position opening said one circuit and closing said by-pass circuit, a vacuum operated switch connected to the intake manifold of the engine in said by-pass circuit maintaining said by-pass circuit closed when said engine is operating, a third circuit, closed by said vacuum operated switch when said engine is stopped, an electric motor actuated by said third circuit, and timed means operable by said motor for retaining said third circuit closed to illuminate said headlights for a predetermined period after stoppage of the engine, said timed means including a cam disc rotatable by said electric motor and a cam actuated switch normally in closed position to close said third circuit until said cam disc opens said cam actuated switch, a second cam disc rotatable by said motor, a solenoid switch closed by said second cam disc, and circuit means operable by said first cam disc to de-energize said solenoid to break said third circuit and extinguish the headlights.

No references cited.